United States Patent [19]
Uemura et al.

[11] Patent Number: 5,159,649
[45] Date of Patent: Oct. 27, 1992

[54] OPTICAL SWITCHING CONNECTOR

[75] Inventors: Yasuo Uemura; Toshihiko Oota; Takashi Shigematsu; Masao Ishikawa, all of Chiba, Japan

[73] Assignee: The Furukawa Electric Co., Ltd., Tokyo, Japan

[21] Appl. No.: 706,694

[22] Filed: May 29, 1991

[30] Foreign Application Priority Data

May 30, 1990 [JP] Japan .................. 2-138346

[51] Int. Cl.$^5$ .................. G02B 6/00; G02B 6/36
[52] U.S. Cl. .................. 385/21
[58] Field of Search ..... 350/96.15, 96.16, 96.20–96.21

[56] References Cited

U.S. PATENT DOCUMENTS 4,607,910 8/1986 Thurenius ............ 350/96.20
4,778,243 10/1988 Finzel ............ 350/96.20

Primary Examiner—Akm E. Ullah
Attorney, Agent, or Firm—Armstrong, Nikaido, Marmelstein, Kubovcik & Murray

[57] ABSTRACT

Disclosed is an optical switching connector including a ferrule plate, which fixes an end of an optical fiber to a predetermined position, has pin grooves formed in parallel at its both ends, and has at least one of its pin grooves formed to a width enabling horizontal movement of a reference pin, pin holding members which position the reference pin in said pin grooves, and a frame body which houses said ferrule plate and pin holding members. The optical switching connector is characterized in that the pin holding members are provided individually for each pin groove and provision is made at the both sides of the pin grooves of members for pressing the pin holding members corresponding to the pin grooves where the reference pins can move horizontally to the ferrule plate.

2 Claims, 3 Drawing Sheets

OPTICAL SWITCHING CONNECTOR

BACKGROUND OF THE INVENTION

1. Field of the Invention

The present invention relates to an optical switching connector used for switching optical paths in an optical fiber line.

2. Description of the Related Art

As one of prior art optical switching connectors used for switching optical paths of optical fiber lines, there has been known the one as shown in FIG. 1a and 1b, disclosed in Japanese Unexamined (Kokai) Patent Application Publication No. 63-85522.

This optical switching connector has a first ferrule 11 and a second ferrule 12 arranged with end faces abutting each other. The first ferrule 11 has two parallel pin holes 13a and 13b, while the second ferrule 12 has two parallel pin holes 14a and 14b. In the corresponding pin holes 13a and 14b and 13b and 14a are inserted reference pins 15 for positioning purposes in a manner so as to span the two ferrules 11 and 12. The respective ones of the pin holes of each of the first and second ferrules 11 and 12, that is, 13a and 14a, are formed to a size which will prevent horizontal movement of the reference pins 15, while the other pin holes 13b and 14b are formed with horizontally longer sectional shapes so as to allow the reference pins 15 to move horizontally by a predetermined pitch P.

Between the two pin holes 13a and 13b of the first ferrule 11n are fixed four optical fibers 17a to 17d of a four-core tape-core line 16 with their end faces exposed, while between the two pin holes of the second ferrule 12 are fixed the two optical fibers 19a and 19b of a two-core line, for example.

If the first ferrule 11 is fixed and the second ferrule 12 is made to be movable horizontally (the reverse is also possible), then in the condition with a force in the direction of the arrow A applied to the second ferrule 12 as shown in FIG. 1a, the two optical fibers 19a and 19b of the second ferrule 12 are connected with the two optical fibers 17a and 17b on one side of the first ferrule 12 to form optical paths. Thereafter, if force in the direction of the arrow B is applied to the second ferrule 12 as shown in FIG. 1b, this moves horizontally and the optical fibers 17c and 17d on the other side of the first ferrule 11 to form optical paths.

The optical switching connector performs switching of optical paths in the above manner.

The above-mentioned first and second ferrules are required to have high dimensional precision, and thus are comprised as the optical switching connector shown in FIG. 2. That is, the optical switching connector 21 is comprised of a ferrule plate 22, a pin holding member 23, a frame body 24, and screws 25a and 25b.

The ferrule plate 22 fixes the end portion of the optical fiber 17 to predetermined position, has pin grooves 26a and 26b formed in parallel at its both sides, has one of the pin grooves 26a formed to a width preventing horizontal movement of the reference pin 15, and has the other pin grooves 26b formed to a width enabling horizontal movement of the reference pin 15. The pin holding member 23 serves as a cover for positioning the reference pins 15 in the pin grooves 26a and 26b, so the pin holes are formed by the pin holding member 23 and the pin grooves 26a and 26b. The ferrule plate 22 and the pin holding member 23 are housed in the frame body 24 and screws 25a and 25b are used to fasten them to form a single body.

Note that the pin grooves 26a and 26b sometimes are both formed to widths enabling the reference pins 15 to move horizontally by a predetermined pitch. In this case, the pin grooves of the opposing optical switching connector are both formed to widths preventing horizontal movement.

This type of conventional optical switching connector has the pin holding member 23 formed of a single plate which is fastened by screws 25a and 25b from directly above the pin grooves 26a and 26b. As a result, bending of the pin holding member 23 occurs at the wide width pin groove 26b as shown by the dotted line A and there are cases where the reference pin 15 cannot be inserted and cases where even when insertable, the resistance to horizontal movement is great and the switching operation cannot be performed smoothly.

Since the pin holding member 23 is a single plate, in the case where the diameter of the reference pin 15 is larger than the design value or the case where the width of the pin groove 26a is smaller than the design value, as shown in FIG. 3, the pin holding member 23 becomes slanted, the switching direction and the direction of arrangement of the optical fibers deviate from each other, and the connection loss increases.

Further, as shown in FIG. 4, in the case where the diameter of the reference pin 15 is smaller than the design value or the case where the width of the pin groove 26a is larger than the design value, the position of the reference pin 15 is uncertain, as a result, the connection loss also increases.

SUMMARY OF THE INVENTION

The present invention provides an optical switching connector which resolves the problems in the prior art mentioned above.

An object of the present invention is to provide an optical switching connector enabling a smooth switching operation.

Another object of the present invention is to provide an optical switching connector wherein a connection loss is reduced.

According to the present invention, it is constituted as an optical switching connector including a ferrule plate, which fixes an end of an optical fiber to a predetermined position, has pin grooves formed in parallel at its two ends, and has at least one of its pin grooves formed to a width enabling horizontal movement of a reference pin, pin holding members which position the reference pins in said pin grooves, and a frame body which houses the ferrule plate and pin holding members, characterized in that the pin holding members are provided individually for each pin groove and provision is made at the two sides of the pin grooves of a means for pressing the pin holding members corresponding to the pin grooves where said reference pins can move horizontally to the ferrule plate.

Another feature of the present invention is that in such an optical switching connector, the thickness of the bottom portion of the frame body is at least the thickness of the ferrule plate.

In the present invention, a pin holding member is provided separately for each pin groove so as to reduce the connection loss caused by dimension error of the reference pins and pin grooves. Further, the pin holding member corresponding to the pin groove where the reference pin can move horizontally is pressed to the ferrule plate at the two sides of the pin groove so as to eliminate the bending caused by the fastening of the pin holding member and enable a smooth switching operation.

Further, the thickness of the bottom portion of the frame body is made not less than the thickness of the ferrule plate so as to eliminate the bending of the frame body caused by the fastening and to reduce the increase of connection loss.

BRIEF DESCRIPTION OF THE DRAWINGS

Other objects and features of the present invention will be described in detail with reference to the accompanying drawings, in that.

DESCRIPTION OF THE PREFERRED EMBODIMENTS

Preferred embodiments of the present invention will be explained in detail with reference to the drawings.

Figure 1A:
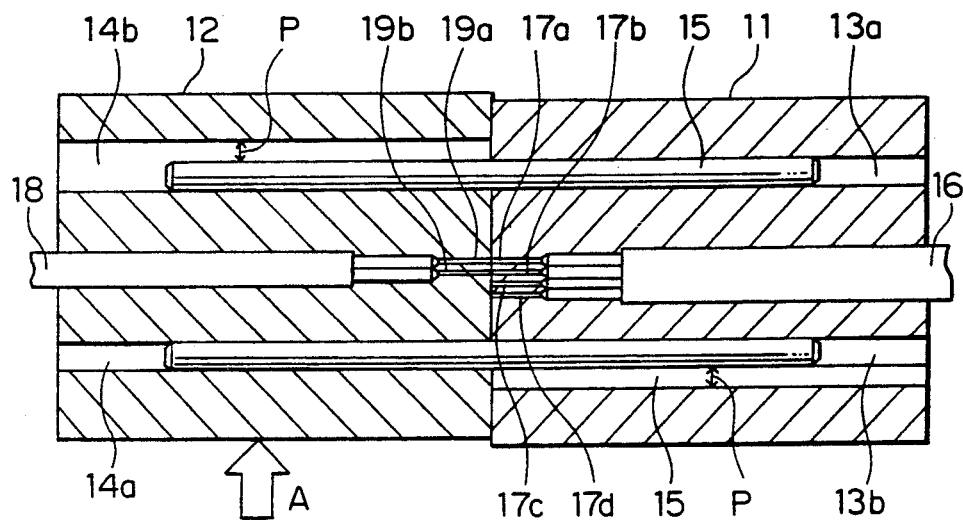
FIGS. 1a and 1b are explanatory views showing the switching operation of an optical switching connector.
Figure 1B:
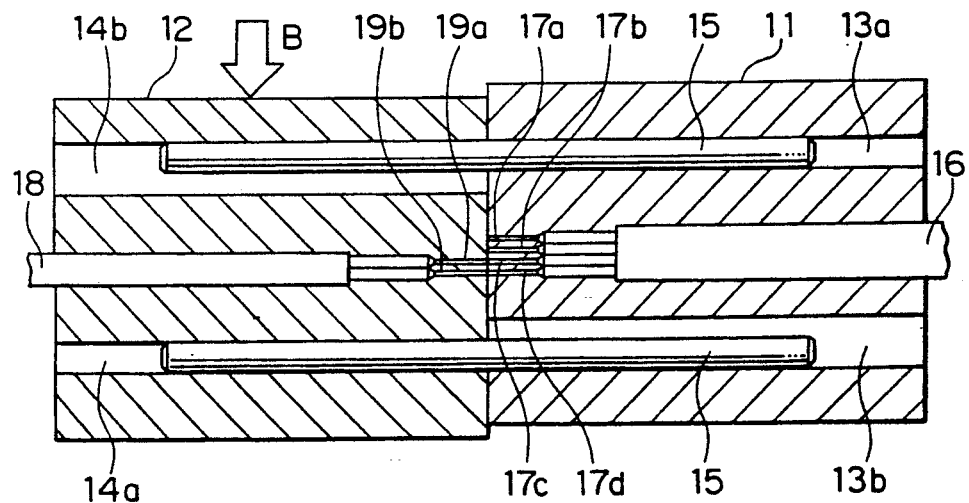
Figure 2:
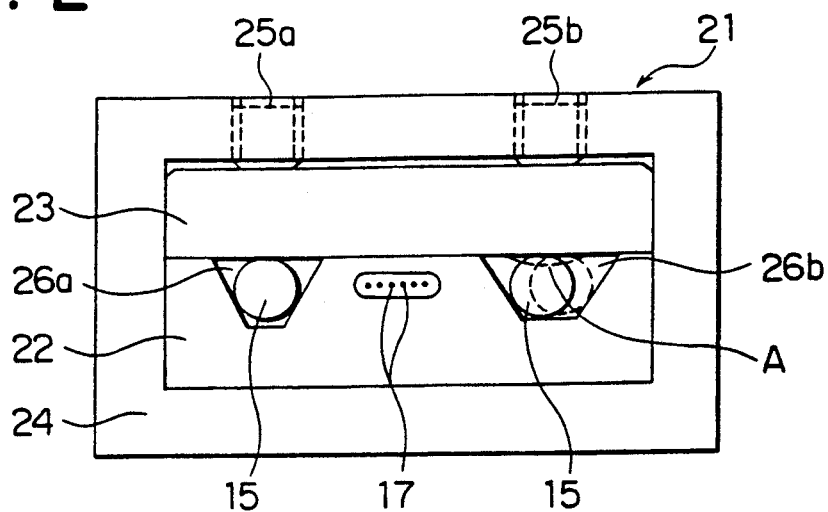
FIG. 2 is a front view showing a conventional optical switching connector.
Figure 3:
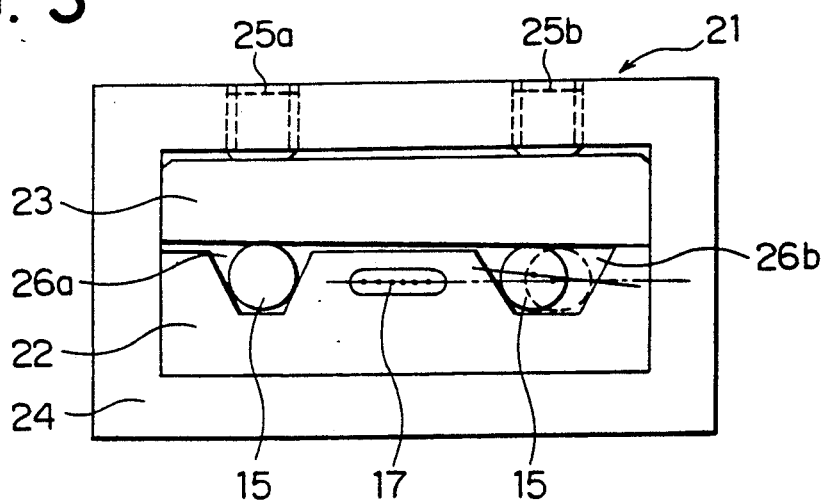
FIG. 3 and FIG. 4 are front views showing the problem of a conventional optical switching connector.
Figure 4:
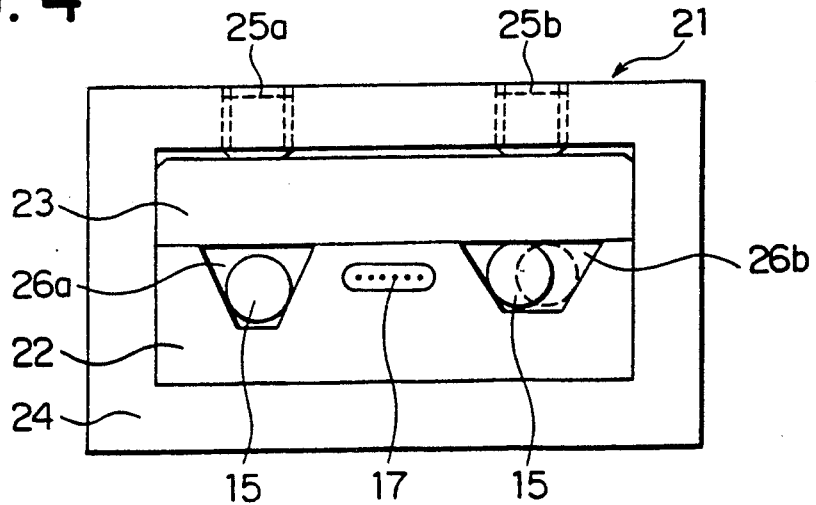
Figure 5:
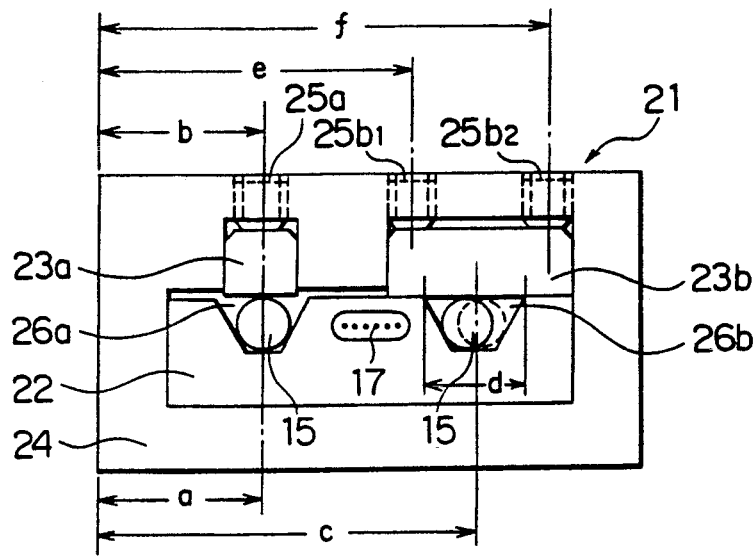
FIG. 5 to FIG. 7 are front views showing embodiments of optical switching connectors according to the present invention.
Figure 6:
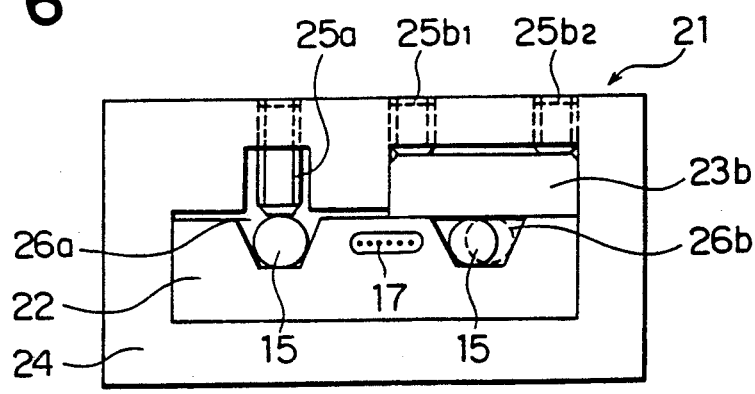
Figure 7:
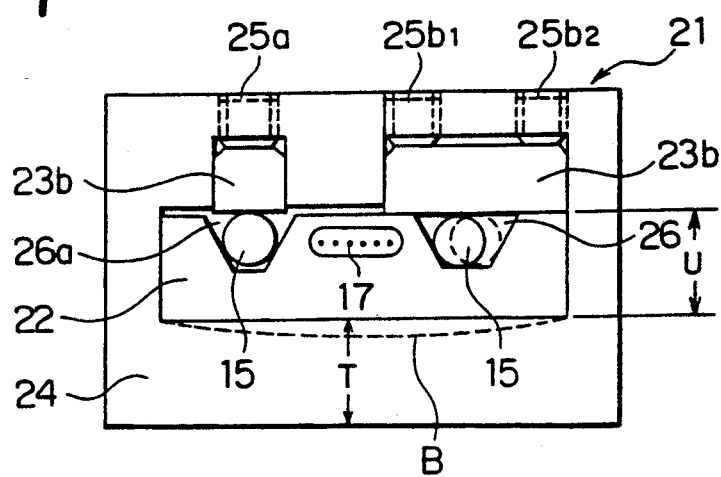

FIG. 5 to FIG. 7 show embodiments of optical switching connectors according to the present invention, wherein portions the same as the previously explained FIG. 2 are given the same reference numerals.

The optical switching connector 21 of FIG. 5 has the pin holding member divided into a pin holding member 23a which holds down the reference pin 15 in the narrow width pin groove 26a and the pin holding member 23b which holds down the reference pin 15 in the wide width pin groove 26b, has the pin holding member 23a on the narrow width pin groove 26a pressed to the reference pin 15 by the screw 25a and has the pin holding member 23b of the wide width pin groove 26b side is eliminated and the switching operation can be performed smoothly.

When 500 switching operations were performed using the optical switching connector of the above construction, the amount of change of the transmission loss was no more than 0.2 dB.

The optical switching connector 21 of FIG. 6 has the reference pin 15 in the narrow width pin groove 26a pressed by the screw 25a. That is, in this embodiment, the screw 25a serves also as a pin holding member. The rest of the construction is the same as in FIG. 5.

The optical switching connector 21 of FIG. 7 has the thickness T of the bottom portion of the frame body 24 made the same as the thickness U of the ferrule plate 22 to prevent the ferrule plate 22 from bending as shown by the dotted line B.

In this type of optical switching connector, the thickness U of the ferrule plate 22 must be 4 mm. As opposed to this, the thickness T of the bottom portion of the frame body 24 was changed to investigate the increase of the loss L (dB) of the optical switching connector. The results are shown in Table 1.

TABLE 1

| Thickness T of bottom of frame body (mm) | Increment of loss L (dB) |
| --- | --- |
| 1.5 | 5.10 |
| 2.0 | 2.87 |
| 3.0 | 0.72 |
| 4.0 | 0 |

If by this the thickness T of the bottom portion of the frame body is made the same or greater than the thickness U of the ferrule plate, it is understood that the increase of loss L caused by the bending of the ferrule plate can be eliminated. When the thickness T of the bottom portion of the frame body is 4.0 mm, if the screws 25a, 25b1, and 25b2 are used to fix the ferrule plate 22 by an axial force of up to 1.5 kg, the amount of bending of the bottom portion of the frame body 24 caused by the axial force becomes no more than 1 μm and therefore the bending of the ferrule plate 22 can be almost completely eliminated and the increase in the transmission loss caused by the bending can also be almost completely eliminated.

Note that in the embodiment, use is made of stainless steel for the frame body, but if use is made of a superhard alloy or ceramic for the frame body, the thickness of the bottom portion of the frame body may be made thinner than in the above case.

As explained above, according to the present invention, the bending of the pin holding member corresponding to the pin groove where the reference pin can move horizontally is eliminated, and thus the switching can be performed smoothly. Further, the reference pins can be fixed securely without regard to dimensional error, and therefore the positioning by the reference pins becomes more accurate and it is possible to form an optical switching connector with very little connection loss. Further, if the thickness of the bottom portion of the frame body is made at least the thickness of the ferrule plate, the bending of the ferrule plate almost completely disappears and in this regard too it is possible to reduce the connection loss.

We claim:

1. An optical switching connector comprising:
   a ferrule plate fixing an end of an optical fiber to a predetermined position, having pin grooves formed in parallel at its both ends, and having at least one of its pin grooves formed to a width enabling horizontal movement of a reference pin;
   pin holding members positioning the reference pin in said pin grooves; and
   a frame body housing said ferrule plate and pin holding members.
   wherein said pin holding members are provided individually for each pin groove, and
   wherein provision is made at the both sides of the pin grooves of a means for pressing the pin holding members corresponding to the pin grooves where said reference pins can move horizontally to the ferrule plate.

2. An optical switching connector as set forth in claim 1, wherein the thickness of the bottom portion of the frame body is at least the thickness of the ferrule plate.

* * * * *